3,001,544
MOISTURE DISTRIBUTOR
Rector C. Fergason, La Porte, Ind., assignor to Allis-Chalmers Manufacturing Company, Milwaukee, Wis.
Filed July 5, 1960, Ser. No. 40,726
6 Claims. (Cl. 137—262)

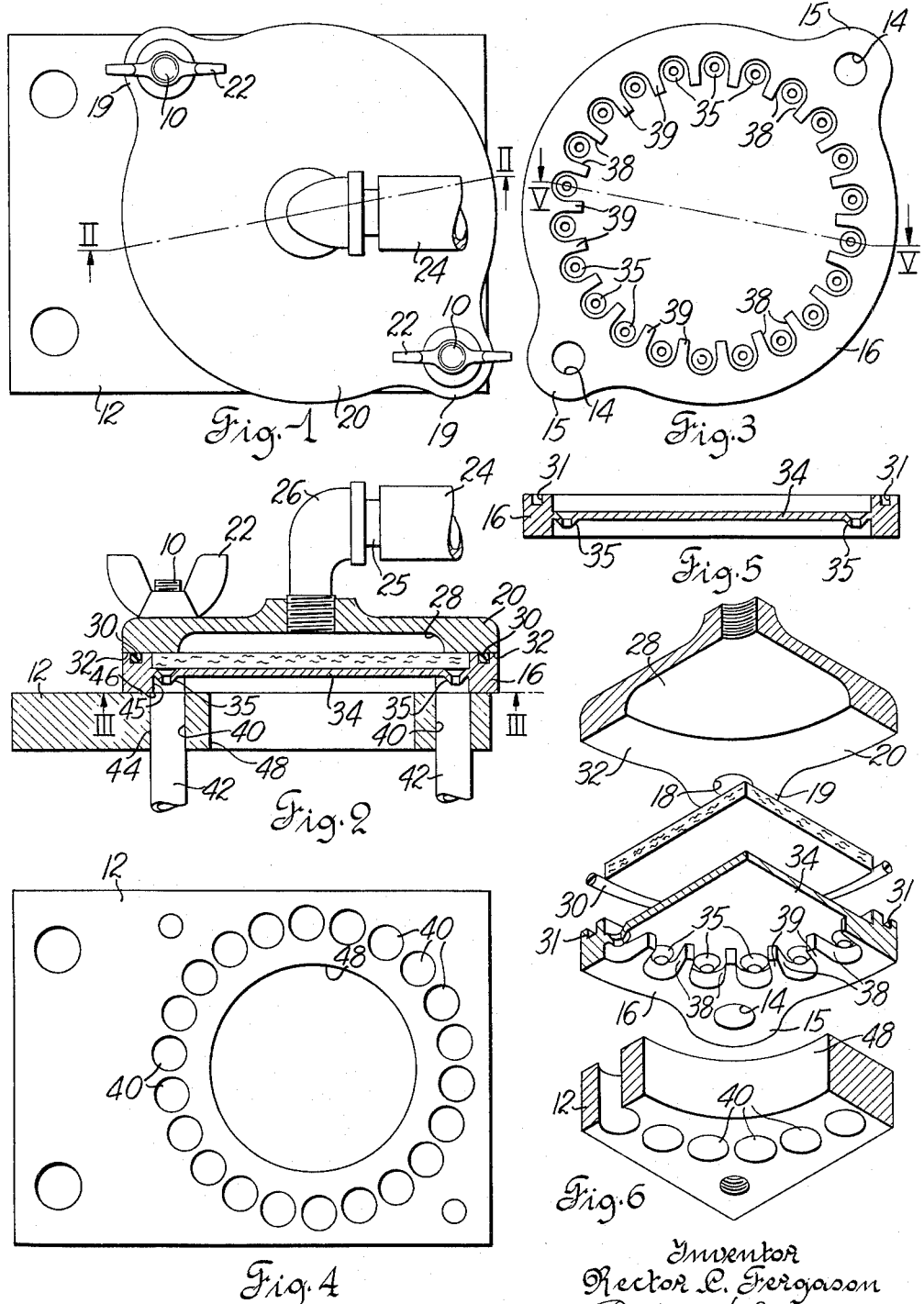

This invention relates to liquid distributing devices and more particularly to water distributing mechanisms of the general type utilized to moisten the spindles of a cotton harvester.

The picking spindles of a cotton picking machine can be made to have an increased affinity for cotton fibers by moistening the picking surfaces of the spindle with a small amount of water. However, if the amount of water used is excessive the quality of the harvested fiber may be lowered and a further. However, if the amount of water used is excessive the quality of the harvested fiber may be lowered and a further, but less important, limitation is the requirement of the larger liquid reservoir necessary to accommodate a high moisture consumption. Accordingly, it is sought to achieve the benefits of spindle moistening with the introduction of the smallest possible quantity of water into the picking operation.

As less moisture is required to perform the picking operation adequately the metering and distribution of moisture becomes progressively more critical. It is necessary that each moistening location be afforded a supply and that the amounts delivered to each of the moistening locations be as nearly identical as possible. The problem is further aggravated by the fact that the harvesting vehicle, in field operation, is subjected to field surface irregularities and the disturbances thereby occasioned must not affect the proper functioning of the metering device.

Under these circumstances, the use of a distributing device having a small reservoir of water that is allowed to overflow into a series of peripherally disposed conduit ends of equal height is inadequate since the chance distribution, as the unit is subjected to operating conditions, is often such as to completely deprive some of the conduit ends of access to the moisture supply.

The obvious alternative is to provide a positive displacement type of metering apparatus. This is an effective solution but even the simplest of such devices requires numerous close tolerance moving parts which make such a unit costly to manufacture and necessitate more rigorous maintenance practices.

It is an object of this invention to provide a moisture distributing device that will supply moisture in small similar quantities to a series of moisture supply conduits.

It is a further object of this invention to provide a moisture distributing device without moving parts.

It is a further object of this invention to provide a moisture distributing device wherein the functioning will not be impaired when it is mounted on a vehicle traveling over uneven ground surface, that is where the device will function properly even though subjected to moderate shock or agitation.

Referring to the drawings:

FIG. 1 is a plan view of the moisture distributing assembly of this invention;

FIG. 2 is a sectional side view of the moisture distributor assembly as taken along line II—II of FIG. 1;

FIG. 3 is a bottom view of the distributor plate taken along the line III—III of FIG. 2;

FIG. 4 is a top view of the underlying supporting plate member of the distributor assembly;

FIG. 5 is a sectional view of the distributor plate taken along the line V—V of FIG. 3; and FIG. 6 is an exploded view of a sector of the distributor assembly of this invention.

Referring to FIG. 1, a pair of upstanding bolts 10 are anchored in the base plate 12 and extend upwardly through the openings 14 in the ears 15 of the distributor plate 16 (FIG. 3) and through openings 18 in the ears 19 of the manifold cover 20. The wing nuts 22 secure the base plate 12, distributor plate 16 and manifold cover 20 to one another.

In FIG. 2, water from a source of supply (not shown) reaches the distributor assembly through the flexible conduit 24, rigid conduit 25 and L 26, entering the chamber formed in the manifold cover by the concave surface 28. The manifold cover 20 is secured tightly against the distributor plate or disc 16 and this junction is sealed by an O ring 30 which is disposed in the groove 31 and compressed by the manifold cover surface 32. The distribution plate 16 has a circular disc portion 34 about the periphery of which is disposed a series of equally spaced downwardly extending conoidal bosses 35 having vertical axes lying on a common circle (FIG. 3). Each boss has an opening through the extremity thereof. Downwardly extending from the periphery of the disc portion are a series of U-shaped vertical surfaces 38 (FIG. 6) which define a series of partially enclosed vertical passageways each of which is associated with a downwardly extending boss. The radially inwardly extending wall portions 39 which define U-shaped surfaces partially surrounding each downwardly extending boss beneath the distribution disc 34 form a partially enclosed vertical passageway between the distribution disc 34 and the base plate 12 with a radially inwardly facing open portion.

The base plate 12 has a series of vertical, cylindrical passageways 40 extending therethrough which underly and are coaxial with the bosses 35. Inserted in the cylindrical passageways 40 in the base plate are a series of flexible moisture supply conduits 42 each of which has a terminal portion underlying and coaxial with a downwardly extending boss. These flexible conduits are inserted from the bottom of the base plate and are retained in position by frictional contact with the surface of the cylindrical passageway. It can be seen in FIG. 2 that the radially outward peripheral surface portion 44 of the cylindrical base plate passage 40 does not coincide in vertical alignment with the radially outward peripheral surface portion 45 of the partially enclosed passageway. By thus establishing a small downwardly facing horizontal abutting surface 46 a stop is formed against which the flexible moisture supply conduit 42 comes in contact upon insertion, thereby preventing insertion of the flexible conduit 42 to the point where it would abut against the distribution disc 34 and close off the radially inwardly facing opening of the partially enclosed passageway. As can be seen in FIGS. 2 and 4, the base plate member 12 has a large opening 48 located centrally of the series of cylindrical openings, which affords each moisture supply conduit passageway a vent connection to the atmosphere by communication through the radially inward facing openings in the partially enclosed passageways.

In the cylindrical space defined above, the distribution disc 34 by the interior cylindrical surface 50 of the distribution plate 16 is a disc of porous material which is retained in position by an inner, annular horizontal surface portion of the manifold cover 20.

In practice, moisture is supplied under pressure from a liquid source (not shown) to the inlet manifold opening. This moisture passes through the disc of porous material and the openings in the downwardly extending bosses. The moisture accumulates on the downwardly extending portion of the boss forming globules that drop through the partially enclosed passageway into the opening of a flexible supply conduit which coaxially underlies each of the boss openings. The radially inwardly extending walls isolate adjoining boss openings and flexible conduits from one another and the radially inwardly extending openings in the partially enclosed passageways provide individual venting to the atmosphere for the respective moisture supply conduits to avoid any possible siphoning that would cause a quantitively unequal moisture supply to be received by the individual supply conduits.

It is not intended to limit the invention to the exact construction herein shown and described for purposes of illustration, as various modifications within the scope of the appended claims may occur to persons skilled in the art.

What is claimed is:

1. A moisture distributing device comprising: a distribution plate having top and bottom surfaces at opposite sides thereof and a series of bosses extending downward from said bottom surface with openings through the extremities of said bosses, a layer of porous material engaging said top surface of said plate; a series of conduit means respectively facing said bosses in moisture receiving relation to the openings therein; a fluid supply conduit in fluid communication with said series of conduit means through said layer of porous material and said boss openings; and individual venting means associated respectively with said conduit means.

2. A moisture distributing device comprising: a distribution disc having top and bottom surfaces at opposite sides thereof and a series of downwardly extending conoidal bosses each of which has an opening in the extremity; an inlet chamber in fluid communication with said top side of said disc and having a moisture receiving opening; a thickness of porous material retained in overlying relation to said series of bosses whereby fluid communication between said inlet chamber and said boss openings is effected through said porous material; a series of conduit means underlying said boss openings in moisture receiving relation thereto; and means for venting said conduit means.

3. A moisture distributing device comprising: a distribution disc having top and bottom surfaces at opposite sides thereof and a series of downwardly extending conoidal bosses each of which has an opening in the extremity thereof; a disc of porous material overlying and engaging said top surface of said distribution disc; a moisture inlet chamber communicating above said distribution disc with said top side of said distribution disc through said porous material, said chamber having a moisture inlet opening; a series of vertical wall portions immediately below said distribution disc and disposed in partially surrounding relation to said bosses with portions intermediate adjoining bosses; a series of conduit means respectively underlying said series of bosses in moisture receiving relation thereto; and means for individually venting said conduit means.

4. A moisture distributing device as in claim 3 wherein said bosses are circularly disposed and equidistant from said moisture inlet opening and said wall portions comprise a series of partitions extending radially inward to form a series of partially enclosed vertical passages of substantially U-shaped horizontal cross section.

5. A moisture distributing device as in claim 4 and further comprising a plate member underlying said distribution disc having a series of conduit receiving passages concentrically underlying said bosses, respectively, and an opening in communication with the openings in said partially enclosed vertical passages.

6. A moisture distributing device comprising: a distribution disc having top and bottom surfaces at opposite sides thereof and a series of downwardly extending conoidal bosses, each of which has an opening in the extremity thereof; a disc of porous material overlying and engaging said top surface of said distribution disc; a moisture inlet chamber above said distribution disc having fluid communication with said boss openings through said porous material; and a series of wall surfaces defining a series of passageways which respectively underly said bosses in moisture receiving relation thereto, each of said passageways having a conduit receiving portion, a vent opening intermediate said conduit receiving portion and said boss, and a downwardly facing horizontal abutting surface at the upper end of said conduit receiving portion.

References Cited in the file of this patent
UNITED STATES PATENTS

| | | |
|---|---|---|
| 1,983,330 | Welch | Dec. 4, 1934 |
| 2,148,414 | Wolfert | Feb. 21, 1939 |